(12) United States Patent
Sun et al.

(10) Patent No.: US 10,610,961 B2
(45) Date of Patent: Apr. 7, 2020

(54) APPARATUS AND METHOD FOR TRIMMING A SHEET METAL EDGE

(71) Applicant: GM GLOBAL TECHNOLOGY OPERATIONS LLC, Detroit, MI (US)

(72) Inventors: Li Sun, Shanghai (CN); David Yang, Shanghai (CN); Xiaochuan Xiong, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 134 days.

(21) Appl. No.: 15/483,708

(22) Filed: Apr. 10, 2017

(65) Prior Publication Data
US 2018/0290233 A1 Oct. 11, 2018

(51) Int. Cl.
| | |
|---|---|
| *B26D 7/10* | (2006.01) |
| *B23K 26/00* | (2014.01) |
| *H05B 6/10* | (2006.01) |
| *B21D 43/28* | (2006.01) |
| *B23K 26/40* | (2014.01) |

(Continued)

(52) U.S. Cl.
CPC ........ *B23K 26/0093* (2013.01); *B21D 43/287* (2013.01); *B23K 26/0604* (2013.01); *B23K 26/073* (2013.01); *B23K 26/082* (2015.10); *B23K 26/0876* (2013.01); *B23K 26/361* (2015.10); *B23K 26/40* (2013.01); *B26D 7/10* (2013.01); *H05B 6/101* (2013.01); *B23K 2101/18* (2018.08); *B23K 2103/04* (2018.08); *B23K 2103/08* (2018.08); *B23K 2103/10* (2018.08); *B23K 2103/12* (2018.08); *B23K 2103/14* (2018.08); *B23K 2103/15* (2018.08); *B23K 2103/26* (2018.08)

(58) Field of Classification Search
CPC  B23K 26/0093; B23K 26/082; B23K 26/361; B23K 26/0604; B23K 26/073; B23K 26/0876; B23K 26/40; B21D 43/287; B26D 7/10; H05B 6/101
USPC ............................. 83/16, 168, 170, 282, 694
See application file for complete search history.

(56) References Cited

U.S. PATENT DOCUMENTS

| | | | |
|---|---|---|---|
| 2,235,532 | A | 3/1941 | Reardon |
| 2,365,998 | A | 12/1944 | Bentley |

(Continued)

FOREIGN PATENT DOCUMENTS

| | | | |
|---|---|---|---|
| JP | 62136310 | * | 6/1987 |
| JP | 63221917 | * | 9/1988 |

OTHER PUBLICATIONS

Lacroix, et al. "Influence of Retained Austenite on the Fracture Strain and Thoughness in Trip-Assisted Multiphase Steels", study at Universite catholique de Louvain, 8 pages.

*Primary Examiner* — Kenneth E Peterson
*Assistant Examiner* — Nhat Chieu Q Do

(57) ABSTRACT

An apparatus for trimming a sheet metal workpiece includes a base to support the sheet metal workpiece at a working position on the base. A shearing tool is connected to the base to trim the sheet metal workpiece by mechanically inducing a shearing stress on the sheet metal workpiece to form an edge at an edge location on the sheet metal workpiece. A heater is connected to the base to define a heated region on the sheet metal workpiece by heating at least the edge location on the sheet metal workpiece after the sheet metal workpiece is in the working position. The apparatus includes a temperature sensor to detect a surface temperature of the heated region.

23 Claims, 10 Drawing Sheets

(51) Int. Cl.
*B23K 26/08* (2014.01)
*B23K 26/082* (2014.01)
*B23K 26/361* (2014.01)
*B23K 26/06* (2014.01)
*B23K 26/073* (2006.01)
*B23K 101/18* (2006.01)
*B23K 103/08* (2006.01)
*B23K 103/14* (2006.01)
*B23K 103/10* (2006.01)
*B23K 103/12* (2006.01)
*B23K 103/04* (2006.01)
*B23K 103/18* (2006.01)

(56) References Cited

U.S. PATENT DOCUMENTS

| | | | |
|---|---|---|---|
| 2,600,453 A | 6/1952 | Weingart | |
| 2,630,519 A | 3/1953 | Gard | |
| 2,654,821 A | 10/1953 | Gillett | |
| 2,672,550 A | 3/1954 | Vaughan | |
| 2,925,864 A | 2/1960 | Rueggeberg | |
| 4,343,209 A * | 8/1982 | Moelbert | B26D 7/10 |
| | | | 72/342.1 |
| 4,413,406 A * | 11/1983 | Bennett | B32B 37/1292 |
| | | | 228/190 |
| 4,537,102 A * | 8/1985 | Balzer | B23D 33/00 |
| | | | 83/16 |
| 5,005,456 A * | 4/1991 | Ballard | B26D 7/10 |
| | | | 83/170 |
| 5,261,152 A * | 11/1993 | Simozaki | H01F 41/0226 |
| | | | 29/609 |
| 7,140,224 B2 | 11/2006 | Luo et al. | |
| 7,260,972 B2 | 8/2007 | Krajewski | |
| 7,305,860 B2 | 12/2007 | Yang et al. | |
| 7,393,421 B2 | 7/2008 | Yang | |
| 7,645,416 B2 | 1/2010 | Buehler et al. | |
| 7,727,337 B2 | 6/2010 | Sachdev et al. | |
| 7,941,907 B2 | 5/2011 | Yang et al. | |
| 8,092,620 B2 | 1/2012 | Sadhukhan et al. | |
| 8,230,713 B2 | 7/2012 | Krajewski et al. | |
| 8,459,084 B2 | 6/2013 | Krajewski et al. | |
| 8,499,607 B2 | 8/2013 | Kleber et al. | |
| 8,549,889 B2 | 10/2013 | Morales | |
| 8,561,450 B2 | 10/2013 | Lee et al. | |
| 8,567,226 B2 | 10/2013 | Morales | |
| 8,663,405 B2 | 3/2014 | Krajewski | |
| 8,671,729 B2 | 3/2014 | Verma et al. | |
| 8,899,094 B1 | 12/2014 | Zhang | |
| 2014/0096583 A1 * | 4/2014 | Cho | B21D 22/208 |
| | | | 72/332 |
| 2014/0223982 A1 | 8/2014 | Lee | |
| 2016/0303635 A1 | 10/2016 | Branagan et al. | |

\* cited by examiner

APPARATUS AND METHOD FOR TRIMMING A SHEET METAL EDGE

INTRODUCTION

Some sheet metal products are made from die-struck blanks. The blanks may be formed into three dimensional products or parts by plastic deformation, for example in a stamping operation. Imperfections and dislocations at the edge of the blank may grow into cracks when the blank is stretched into the final shape of the sheet metal product. In some cases, edge cracks may not be acceptable in certain sheet metal products.

SUMMARY

An apparatus for trimming a sheet metal workpiece includes a base to support the sheet metal workpiece at a working position on the base. A shearing tool is connected to the base to trim the sheet metal workpiece by mechanically inducing a shearing stress on the sheet metal workpiece to form an edge at an edge location on the sheet metal workpiece. A heater is connected to the base to define a heated region on the sheet metal workpiece by heating at least the edge location on the sheet metal workpiece after the sheet metal workpiece is in the working position. The apparatus includes a temperature sensor to detect a surface temperature of the heated region.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

The present disclosure relates to examples of an apparatus and method for trimming a sheet metal edge to reduce edge cracks during sheet metal forming.

Imperfections and dislocations at the edge of a sheet metal blank may grow into cracks when the sheet metal blank is stretched into a final shape of a sheet metal product. In some cases, edge cracks may not be acceptable in certain sheet metal products.

Figure 1:
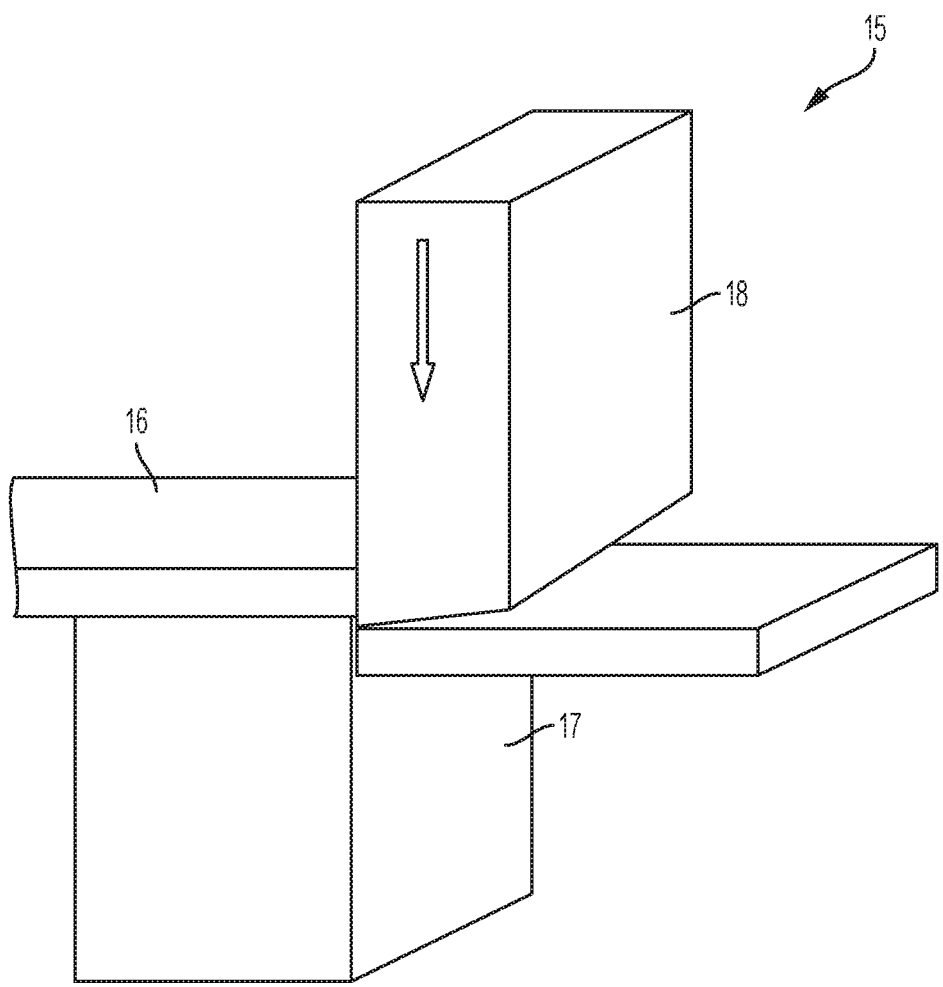
FIG. 1 is a semi-schematic perspective view of a shearing device with a piece of sheet metal that has been trimmed by the shearing device.

FIG. 1 is a semi-schematic perspective view of a shearing device 15 with a piece of sheet metal 16 that has been trimmed by the shearing device 15. The shearing device 15 in FIG. 1 has a lower blade (die) 17 and an upper blade (punch) 18 that are passed closely together under a shearing force (e.g. from a press not shown) to shear the piece of sheet metal 16.

Figure 2:
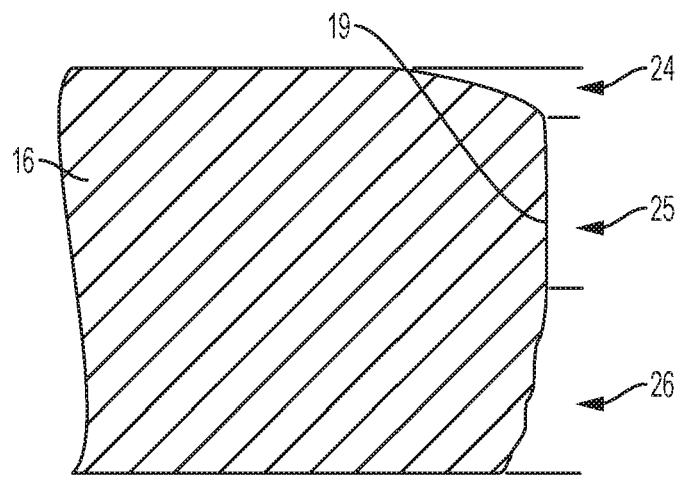
FIG. 2 is a cross-sectional view of a sheared edge of a piece of sheet metal.

FIG. 2 is a cross-sectional view of a sheared edge 19 of the piece of sheet metal 16 from FIG. 1. The sheared edge 19 has a roll-over zone 24 on the punch side 21 of the piece of sheet metal 16. A burnish zone 25 is next to the roll-over zone 24. The burnish zone 25 is generally smoothed by sliding contact of the sheet metal material on opposite sides of the sheared edge 19. Next to the burnish zone 25 is a fracture zone 26. The fracture zone 26 may be relatively rough compared to the burnish zone 25. In the fracture zone 26, micro-cracks may be present. Such micro-cracks may be initiators for edge-cracks if the edge 35 of the piece of sheet metal 16 is stretched when the piece of sheet metal 16 is formed into a product.

To reduce the number of edge-cracks that may be unacceptable in a product, laser trimming may be used to produce an edge 35 that is less likely to crack when the edge 35 is stretched to form a product. However, laser trimming may be relatively expensive and time consuming.

The inventors of the present disclosure have unexpectedly and fortuitously discovered that heating the edge location of a sheet metal workpiece just before shearing the sheet metal workpiece may reduce the likelihood of crack formation during subsequent forming operations as the sheet metal workpiece if formed into a product.

Figure 3:
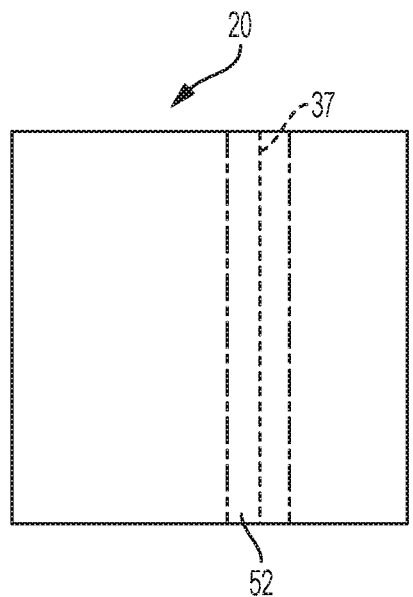
FIG. 3 is a top view of a sheet metal workpiece depicting a heated region and an edge location prior to being trimmed according to an example of the present disclosure.

FIG. 3 is a top view of an example of a sheet metal workpiece 20 according to the present disclosure. A heated region 52 has been defined around an edge location 37. According to the present disclosure, the heated region 52 is heated prior to the sheet metal workpiece 20 being trimmed to form a blank for further processing into a product. By heating a portion of the sheet metal workpiece 20, rather than the entire sheet metal workpiece 20, energy may be saved.

Figure 4:
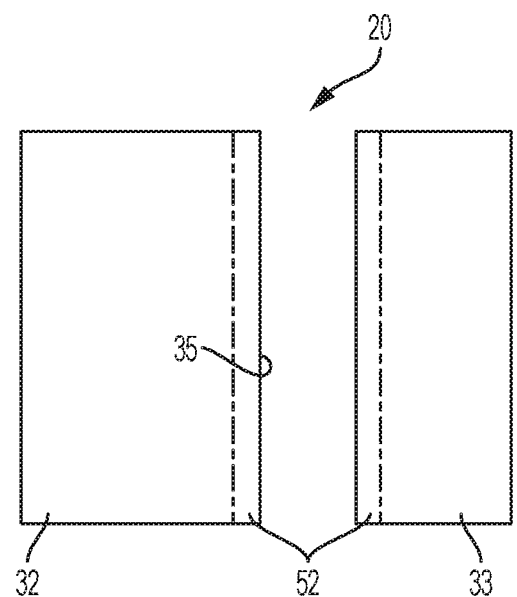
FIG. 4 is a top view of the sheet metal workpiece depicting the heated region and an edge after the sheet metal workpiece depicted in FIG. 3 has been trimmed.

FIG. 4 is a top view of the sheet metal workpiece 20 depicting the heated region 52 and an edge 35 after the sheet metal workpiece 20 depicted in FIG. 3 has been trimmed according to the present disclosure. A shearing tool 40 shears the edge 35 at the edge location 37, dividing the sheet metal workpiece 20 into a blank 32 and piece of scrap 33. The scrap 33 may be processed as scrap, (e.g. recycled); however, it is also contemplated that the scrap 33 may be another usable blank.

Figure 5:
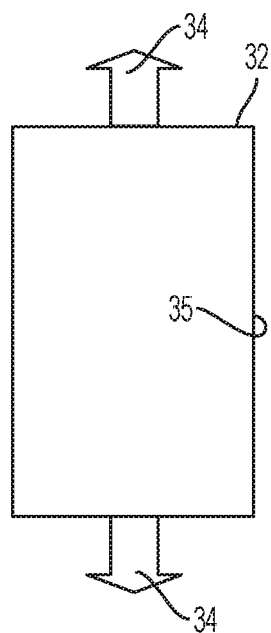
FIG. 5. is a top view of the sheet metal workpiece depicted in FIG. 4 being subjected to forming stress according to an example of the present disclosure.

FIG. 5 is a top view of the blank 32 formed from the sheet metal workpiece 20 depicted in FIG. 4 being subjected to forming stress 34 according to the present disclosure. The forming stress 34 could, for example, stretch the edge 35 in a stamping operation, a rolling operation, or any other forming operation that applies stress to plastically deform the blank 32 at the edge 35 to form a product 36 (see FIG. 6).

Figure 6:
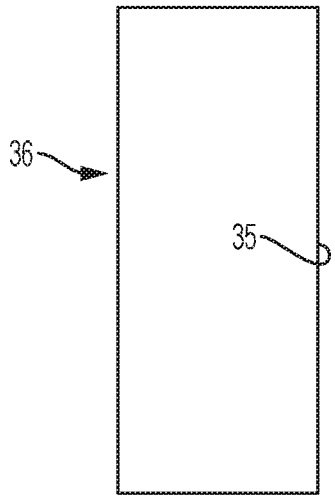
FIG. 6. is a top view of the sheet metal workpiece depicted in FIG. 5 after plastic deformation via the forming stress depicted in FIG. 5.

FIG. 6. is a top view of the product 36 formed from the blank 32 depicted in FIG. 5 after plastic deformation via the forming stress 34 depicted in FIG. 5. The product 36 has less cracking at the edge 35 compared to a similar product subjected to the same processes except without heating the heated region 52 prior to trimming.

Figure 7A:
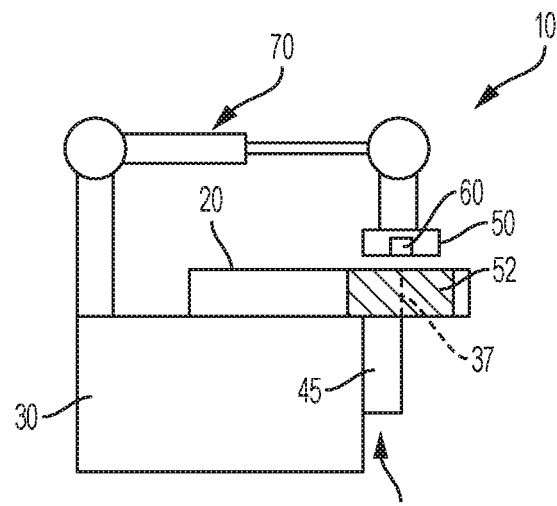
FIG. 7A is a semi-schematic side view of an apparatus for trimming a sheet metal workpiece with the sheet metal workpiece in the working position and the heater heating at least the edge location according to an example of the present disclosure.

FIG. 7A is a semi-schematic side view of an apparatus 10 for trimming a sheet metal workpiece 20 with the sheet metal workpiece 20 in the working position and the heater 50 heating at least the edge location 37 according to the present disclosure. Since this is a semi-schematic view, the relative size of the particular entities in the drawing is not conveyed by the drawing. For example, drawing 7A is not intended to convey that the sheet metal workpiece 20 is relatively thick. The sheet metal workpiece 20 may be thin like foil, or much thicker. The working position means the location on the base that the sheet metal workpiece 20 is in when the shearing tool 40 trims the sheet metal workpiece 20 by mechanically inducing a shearing stress on the sheet metal workpiece 20 to form an edge 35 at an edge location 37 on the sheet metal workpiece 20. In examples of the present disclosure, an apparatus 10 for trimming a sheet metal workpiece 20 includes a base 30 to support the sheet metal workpiece 20 at the working position on the base 30. The apparatus 10 further includes a shearing tool 40 connected to the base 30 to trim the sheet metal workpiece 20 by mechanically inducing a shearing stress on the sheet metal workpiece 20 to form an edge 35 at an edge location 37 on the sheet metal workpiece 20. The apparatus 10 has a heater 50 connected to the base 30 to define a heated region 52 on the sheet metal workpiece 20 by heating at least the edge location 37 on the sheet metal workpiece 20 after the sheet metal workpiece 20 is in the working position. The apparatus 10 has a temperature sensor 60 to detect a surface temperature of the heated region 52. In examples, the temperature sensor 60 may be a contacting sensor such as a thermocouple, or a non-contacting sensor such as a pyrometer or infra-red thermometer.

Figure 7B:
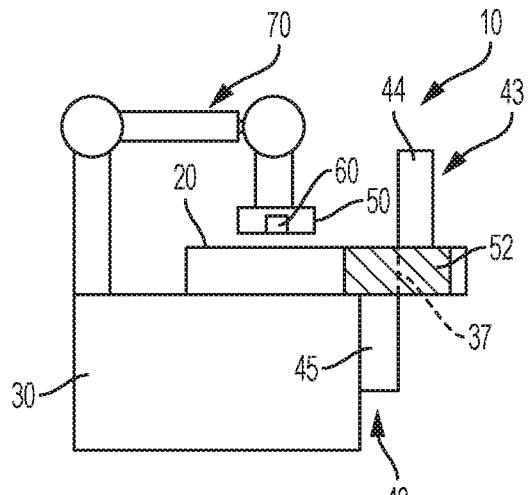
FIG. 7B is a semi-schematic side view of the apparatus depicted in FIG. 7A with a shearing tool positioned to trim the edge.
Figure 7C:
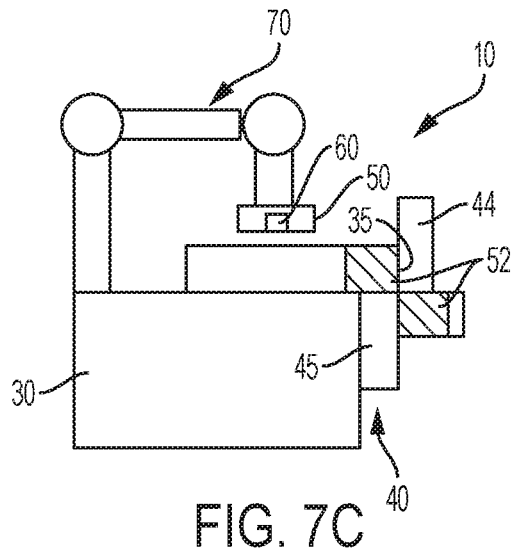
FIG. 7C is a semi-schematic side view of the apparatus depicted in FIG. 7B after the shearing tool has trimmed the edge.

FIG. 7B is a semi-schematic side view of the apparatus 10 depicted in FIG. 7A with the shearing tool 40 positioned to trim the edge 35 (see FIG. 7C) according to the present disclosure. FIG. 7C is a semi-schematic side view of the apparatus 10 depicted in FIG. 7B after the shearing tool 40 has trimmed the edge 35 according to the present disclosure.

In examples of the present disclosure, the heater 50 may be movable relative to the sheet metal workpiece 20. A motion controller 70 may be to determine a relative position of the heater 50 with respect to the sheet metal workpiece 20. The motion controller 70 may be to move the heater 50 relative to the sheet metal workpiece 20. The motion controller may have between one and 6 axes of motion. The same motion controller 70 may be used for moving the heater 50 and for moving or aligning a portion of the shearing tool 40. For example, if the shearing tool 40 resembles a pizza cutting wheel, the heater 50 may heat the sheet metal workpiece 20 just ahead of the cutting path of the cutting wheel. If the sheering tool 40 is a guillotine 43, the heater 50 may be connected to a moving blade 44 or a fixed blade 45 to heat the edge location 37 before the guillotine 43 trims the sheet metal workpiece 20.

Figure 8:
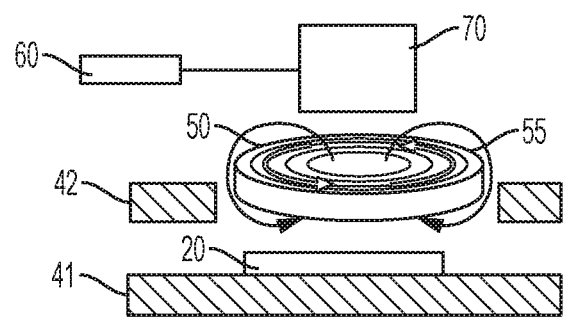
FIG. 8 is a semi-schematic end view of an example of the apparatus with an induction heater according to an example of the present disclosure.
Figure 9:
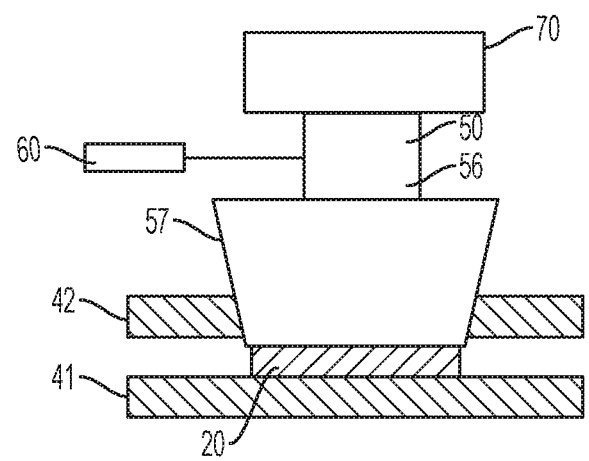
FIG. 9 is a semi-schematic end view of an example of the apparatus with a laser heater according to an example of the present disclosure.

The heater 50 may be, for example, an induction heater 55. FIG. 8 is a semi-schematic end view of an example of the apparatus 10 with an induction heater 55 according to the present disclosure.

Figure 11:
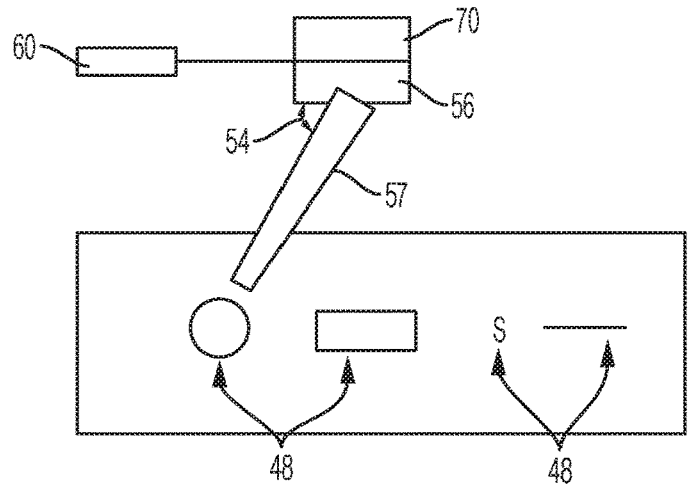
FIG. 11 is a schematic view depicting a laser that can scan over the workpiece by changing the angle of emission of the laser beam from the laser over the sheet metal workpiece.

In examples of the present disclosure depicted in FIG. 7A-FIG. 7C, FIG. 9, FIG. 11, FIG. 12, and FIG. 13, the heater 50 may be a laser 56 that emits a laser beam 57 (see e.g. FIG. 11). As depicted in FIG. 11, the laser 56 may be to scan the laser beam 57 by changing an angle of emission 54 of the laser beam 57 from the laser 56 over the sheet metal workpiece 20 to define the heated region 52 on the sheet metal workpiece 20. The symbols 48 in FIG. 11 are meant to convey that the laser 56 can scan the laser beam 57 over any path or pattern, including open and closed curves, along straight lines, and forming any polygon. Thus, the heated region 52, and the corresponding edge location 37 and edge 35 may have any shape. For example, the edge 35 may define a hole that is punched or lanced in the sheet metal workpiece. In another example, the edge 35 may be a straight line as shown in FIG. 4. In another example, the edge 35 may outline a complex curve for a sheet metal part that is ultimately formed into a vehicle structural reinforcement such as a door panel reinforcement (not shown).

Figure 10A:
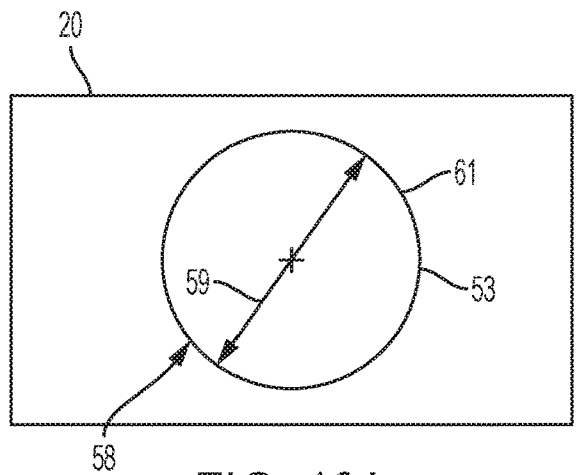
FIG. 10A is a top view of a sheet metal workpiece with an irradiated area, irradiated by the laser beam.

FIG. 10A is a top view of a sheet metal workpiece 20 with an irradiated area 58, irradiated by the laser beam 57. The laser beam 57 may have an adjustable laser beam shape 53. In FIG. 10A, the adjustable laser beam shape 53 has been adjusted to simultaneously irradiate an area bounded by a circle 61. In examples, the irradiated area 58, irradiated by the laser beam 57, may be bounded by a circle 61 having an adjustable beam diameter 59 from about 0.1 millimeter (mm) to about 30 mm.

Figure 10B:
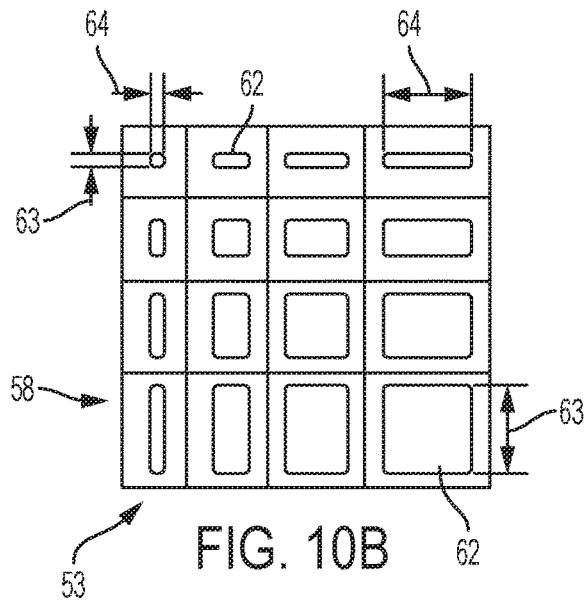
FIG. 10B is a schematic view of a matrix of areas irradiated by the laser beam showing the irradiated area being bounded by an adjustable rectangle according to an example of the present disclosure.

FIG. 10B is a schematic view of a matrix of irradiated areas 58 irradiated by the laser beam 57 (see, e.g., FIG. 9) showing the irradiated area 58 being bounded by an adjustable rectangle according to the present disclosure. In an example, the irradiated area 58 irradiated by the laser beam 57 may be bounded by an adjustable rectangle 62 having an adjustable length 63 from about 1 mm to about 200 mm and/or an adjustable width 64 from about 1 mm to about 4 mm.

In examples of the present disclosure, the shearing tool 40 may include a die 41 and a punch 42. In other examples, the sheering tool 40 may include a guillotine 43 having a moving blade 44 to move across a fixed blade 45 to shear the sheet metal workpiece 20. The shearing tool 40 may be any tool that can mechanically induce a shearing stress on the sheet metal workpiece 20 to form an edge 35 at an edge location 37 on the sheet metal workpiece 20. The shearing tool 40 may form the edge 35 by and suitable method including, but not limited to, lancing, punching, blanking, stamping, cropping, cutting, and/or shearing.

Figure 12:
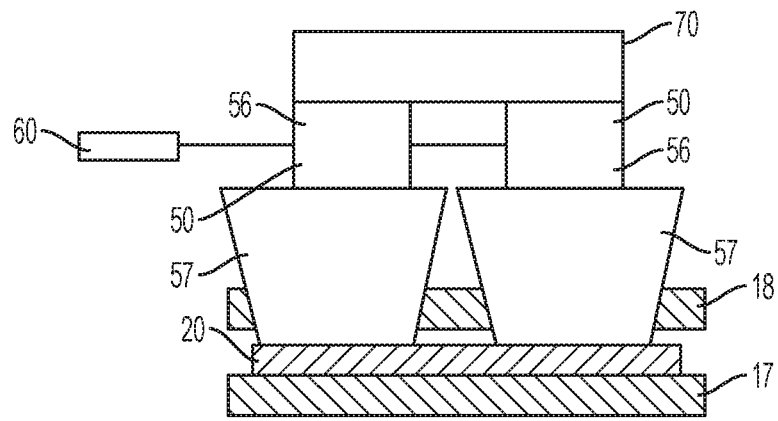
FIG. 12 is a semi-schematic end view of an example of the apparatus with the laser heater having a plurality of laser beams and a plurality of edge locations on the workpiece according to an example of the present disclosure.
Figure 13:
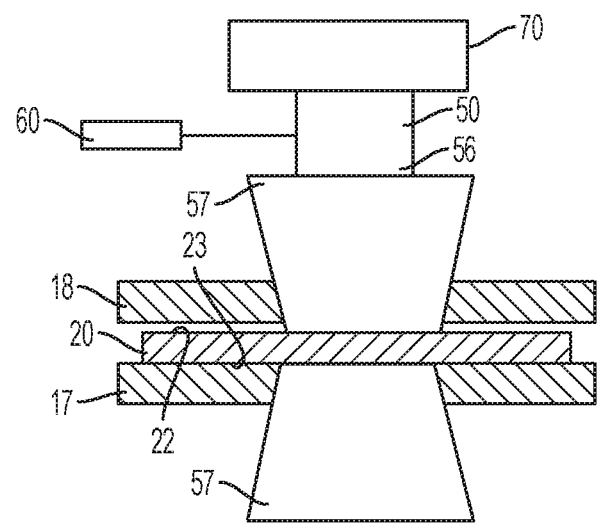
FIG. 13 is a semi-schematic end view of an example of the apparatus with the heater simultaneously applying heat to at least a portion of the top face and at least a portion of the bottom face of the sheet metal workpiece according to an example of the present disclosure.

FIG. 12 is a semi-schematic end view of an example of the apparatus 10 with the laser 56 heater 50 having a plurality of laser beams 57 and a plurality of edge locations 37 on the sheet metal workpiece 20 according to the present disclosure;

In examples as depicted in FIG. 13, the sheet metal workpiece 20 may have a top face 22 and a bottom face 23 opposite the top face 22. The heater 50 may be to heat at least a portion of the top face 22 and at least a portion of the bottom face 23 simultaneously.

Figure 14:
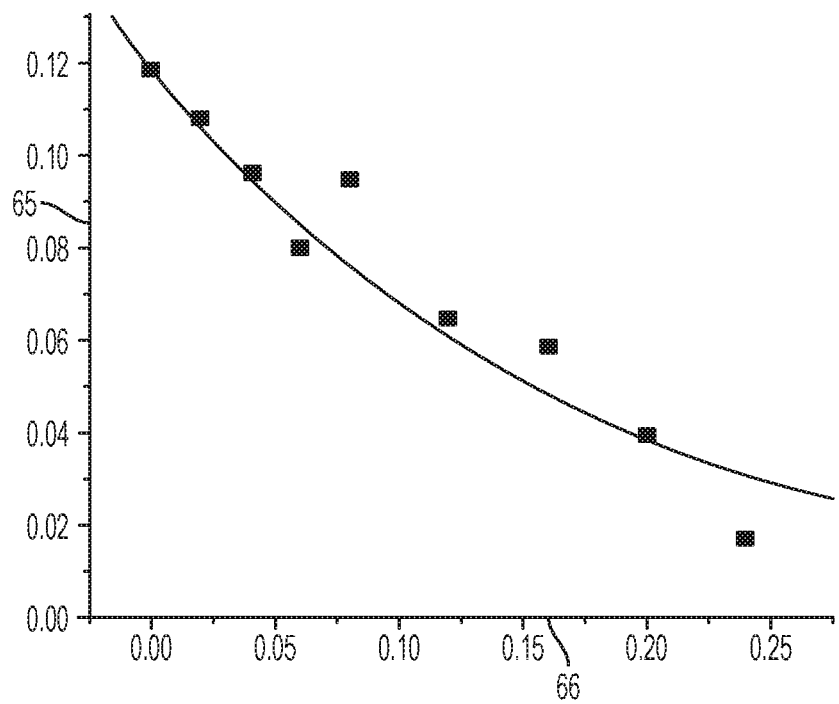
FIG. 14 is a graph depicting an empirically derived relationship between deformation and retained austenite.

FIG. 14 is a graph depicting an empirically derived relationship between deformation and retained austenite. The ordinate axis 65 is the Retained Austenite Volume Fraction (dimensionless). The abscissa 66 is strain (dimensionless). The curve 67 shows that there is a reduction in Retained Austenite Volume Fraction with increasing strain. Under strain, the austenite undergoes a phase transformation to martensite. A blank with a larger Retained Austenite Volume Fraction at the edge 35 tends to have a lower propensity to form cracks during operations subsequent to creating the edge 35 by the heat assisted shearing of the present disclosure. Without being held bound to any theory, it is believed that retained austenite undergoes a phase transformation to hard and brittle martensite under the strain of room temperature shearing. The presence of brittle martensite can reduce crack resistance, particularly when the martensite is at an edge. However, the retained austenite in the heated region of the sheet metal workpiece experiences less of the phase transformation to martensite during the heat assisted shearing of the present disclosure. Thus, an edge with a higher retained austenite volume fraction has a lower fraction of martensite after the heat assisted shearing. Therefore, more retained austenite at the edge can correspond to less martensite and greater crack resistance according to the present disclosure.

Figure 15:
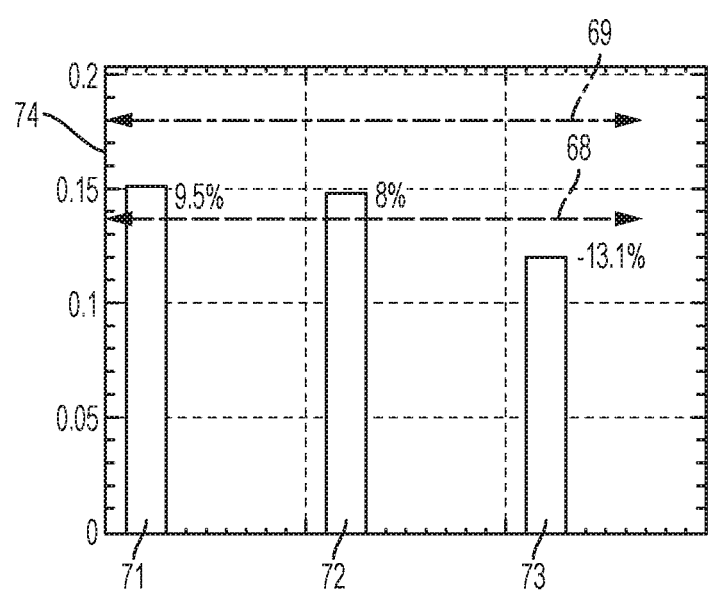
FIG. 15 is a column graph showing ductility results of test samples heated to various temperatures and trimmed according to an example of the present disclosure.

FIG. 15 is a column graph showing ductility results of half dog bone tensile tests on samples heated to various temperatures and trimmed according to the present disclosure. One tensional edge is Electrical Discharge Machining (EDM) trimmed and another tensional edge is trimmed after preheating according to the present disclosure. The ordinate axis 74 is ductility (dimensionless). The horizontal line at reference numeral 68 represents the ductility of a baseline sample that was trimmed at room temperature (about 20° C.). The horizontal line at reference numeral 69 represents the ductility of a sample with both edges trimmed using EDM with the sample at room temperature. Samples produced using EDM are expected to have the best achievable ductility for a particular material because the edge is formed without shearing. The column at reference numeral 71 represents a sample trimmed by shearing at 80° C. Sample 71 had a 9.5% improvement in ductility compared to the baseline sample 68. The column at reference numeral 72 represents a sample trimmed by shearing at 100° C. Sample 72 had an 8% improvement in ductility compared to the baseline sample 68. The column at reference numeral 73 represents a sample trimmed by shearing at 200° C. Sample 73 had a 13.1% decrease in ductility compared to the baseline sample 68. Thus, it may be advantageous to control the temperature of the heat assisted shearing within the effective target temperature range for a particular material. The samples in FIG. 15 were Transformation Induced Plasticity (TRIP) steel.

The sheet metal workpiece 20 in the present disclosure may be any sheet metal. In examples of the present disclosure, the sheet metal workpiece 20 may not be limited to sheet metal that may have austenite and martensite. In non-limiting examples, the sheet metal may be steel, aluminum, titanium, brass, copper, tin, gold, silver, platinum, nickel, cadmium, chromium, magnesium, lead or any alloy including these materials. In examples, the sheet metal workpiece 20 may be TRIP steel.

FIGS. 16A-16G together are a flow chart depicting a method 100 of trimming a sheet metal workpiece. At box 110 is "clamping a sheet metal workpiece at a working position on a base." Flow chart connector F connects box 110 of FIG. 16A with the top of FIG. 16G. At box 112 is "detecting a surface temperature of a heated region." At box 114 is "after the sheet metal workpiece is in the working position, in response to the surface temperature, heating, via a heater connected to the base, at least an edge location on the sheet metal workpiece to define the heated region on the sheet metal workpiece." Flow chart connector E connects box 114 of FIG. 16A with the top of FIG. 16F. At box 116 is "after the heating, while the surface temperature remains within a target temperature range, trimming the sheet metal workpiece by mechanically inducing a shearing stress on the sheet metal workpiece to form an edge at the edge location on the sheet metal workpiece." Flow chart connector C connects box 116 of FIG. 16A with the top of FIG. 16D. Flow chart connector D connects box 116 of FIG. 16A with the top of FIG. 16E.

At box 118 is "removing the sheet metal workpiece from the working position on the base." At box 120 is "the heater is movable relative to the sheet metal workpiece." At box 122 is "a motion controller is to determine a relative position of the heater with respect to the sheet metal workpiece." At box 124 is "the motion controller is to move the heater relative to the sheet metal workpiece." At box 117 is "the target temperature range is 50 degrees Celsius to 600 degrees Celsius." In a further example, the target temperature range may be 50 degrees Celsius to 500 degrees Celsius.

Figure 16A:
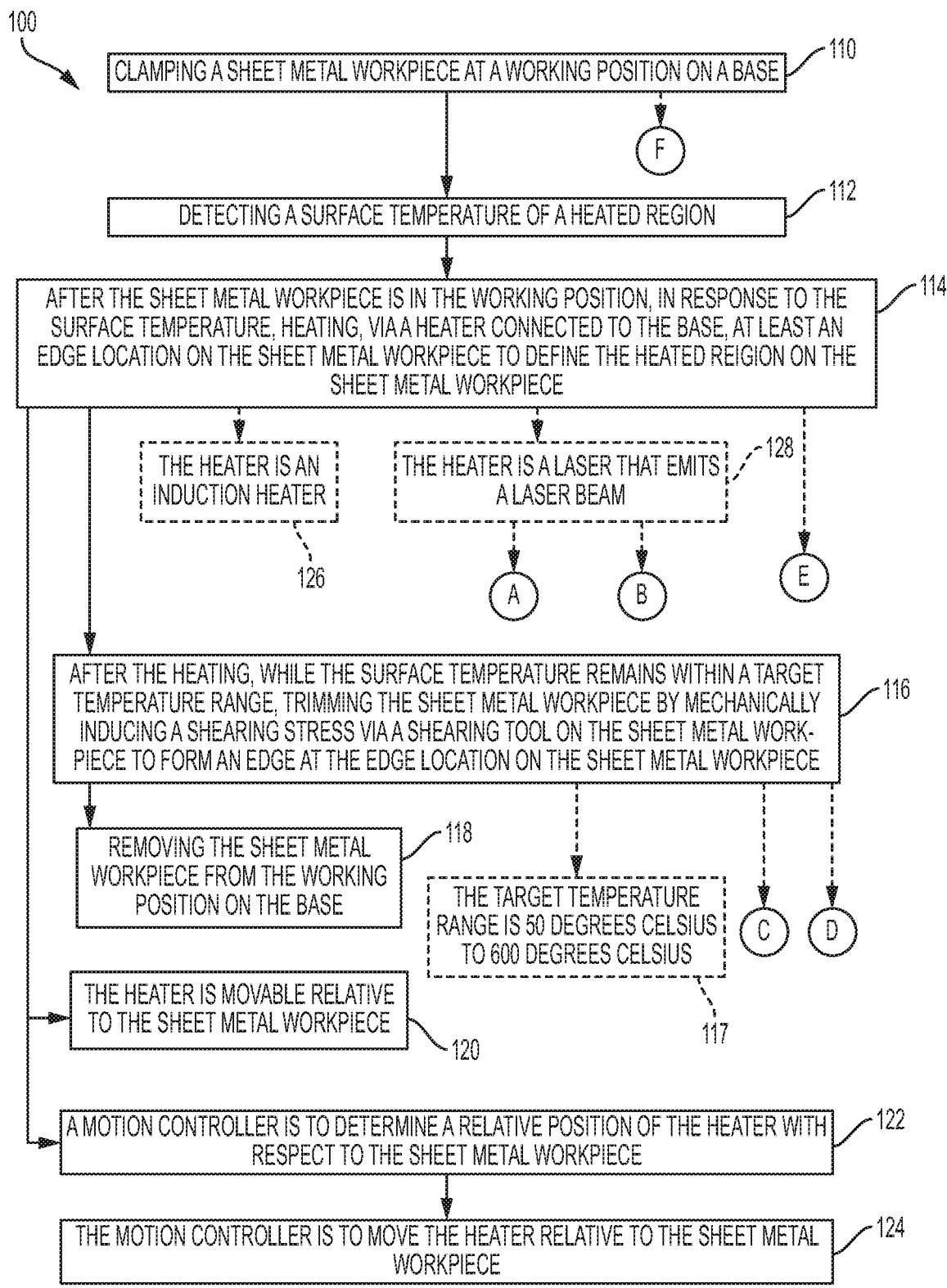
FIGS. 16A-FIG. 16G together are a flow chart depicting a method of trimming a sheet metal workpiece according to an example of the present disclosure.
Figure 16B:
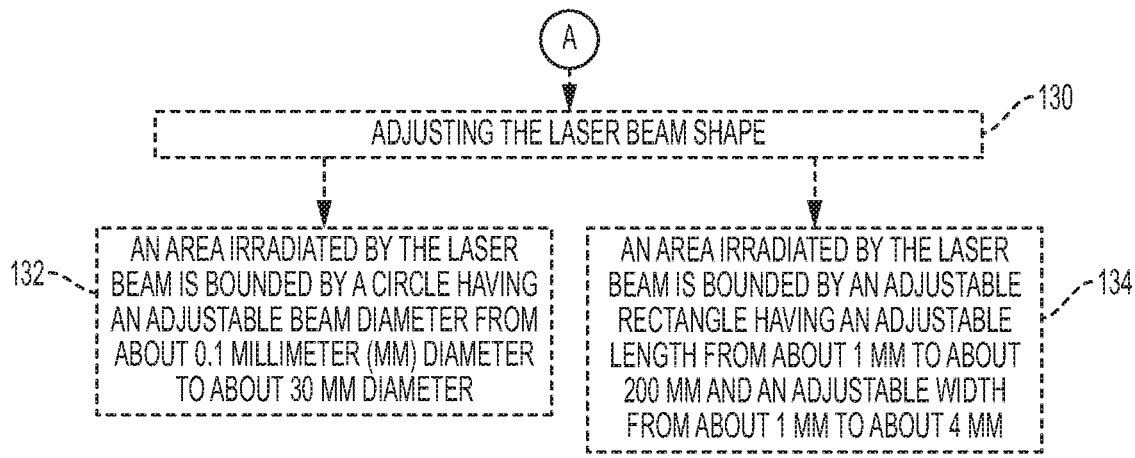

At box 126 is "the heater is an induction heater." At box 128 is "the heater is a laser that emits a laser beam." Flow chart connector A connects box 128 of FIG. 16A with the top of FIG. 16B. Flow chart connector B connects box 128 of FIG. 16A with the top of FIG. 16C.

FIG. 16B has a flow chart connector A to connect FIG. 16B with box 128 of FIG. 16A. At box 130 is "adjusting the laser beam shape." At box 132 is "an area irradiated by the laser beam is bounded by a circle having an adjustable beam diameter from about 0.1 millimeter (mm) diameter to about 30 mm diameter." At box 134 is "an area irradiated by the laser beam is bounded by an adjustable rectangle having an adjustable length from about 1 mm to about 200 mm and an adjustable width from about 1 mm to about 4 mm."

Figure 16C:
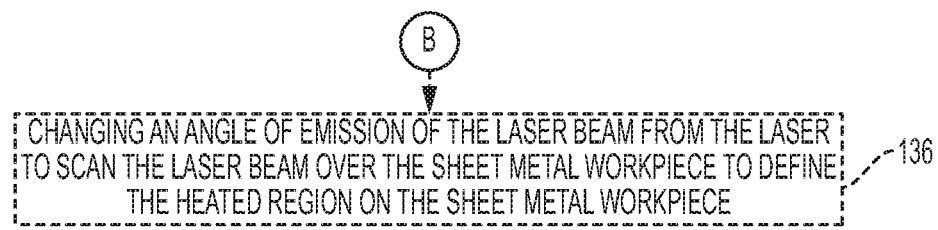

FIG. 16C has a flow chart connector B to connect FIG. 16C with box 128 of FIG. 16A. At box 136 is "changing an angle of emission of the laser beam from the laser to scan the laser beam over the sheet metal workpiece to define the heated region on the sheet metal workpiece."

Figure 16D:

FIG. 16D has a flow chart connector C to connect FIG. 16D with box 116 of FIG. 16A. At box 138 is "the shearing tool includes a die and a punch."

Figure 16E:
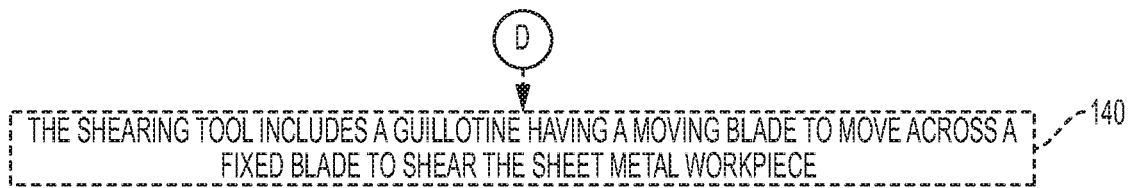

FIG. 16E has a flow chart connector D to connect FIG. 16E with box 116 of FIG. 16A. At box 140 is "the shearing tool includes a guillotine having a moving blade to move across a fixed blade to shear the sheet metal workpiece."

Figure 16F:
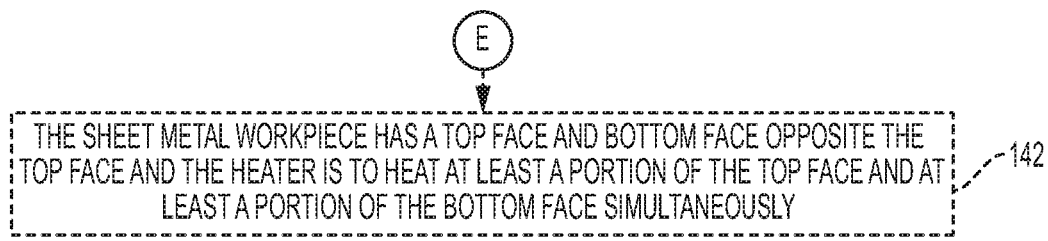

FIG. 16F has a flow chart connector E to connect FIG. 16F with box 114 of FIG. 16A. At box 142 is "the sheet metal workpiece has a top face and a bottom face opposite the top face and the heater is to heat at least a portion of the top face and at least a portion of the bottom face simultaneously."

Figure 16G:
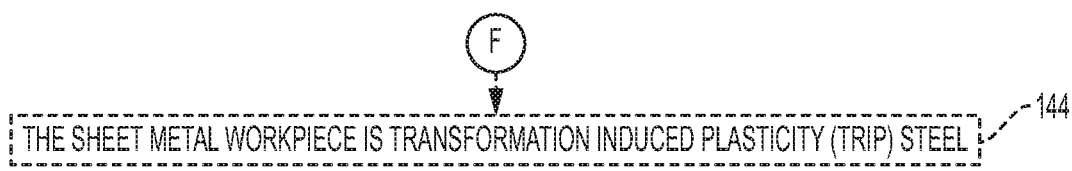

FIG. 16G has a flow chart connector F to connect FIG. 16G with box 110 of FIG. 16A. At box 144 is "the sheet metal workpiece is Transformation Induced Plasticity (TRIP) steel."

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range of from about 0.1 mm to about 30 mm should be interpreted to include not only the explicitly recited limits of from about 0.1 mm to about 30 mm, but also to include individual values, such as 0.8 mm, 27 mm, etc., and sub-ranges, such as from about 1.5 mm to about 25.2 mm, etc. Furthermore, when "about" is utilized to describe a value, this is meant to encompass minor variations (up to +/−10 percent) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

The invention claimed is:

1. An apparatus for trimming a sheet metal workpiece, comprising:
a base configured to support the sheet metal workpiece at a working position on the base;
a shearing tool connected to the base configured to trim the sheet metal workpiece by mechanically inducing a shearing stress on the sheet metal workpiece to form an edge at an edge location on the sheet metal workpiece, the shearing tool including a guillotine having a moving blade and a fixed blade, the moving blade being configured to move across the fixed blade to shear the sheet metal workpiece along a shearing plane;
a heater connected to the base; and
a motion controller for moving the heater independent of the shearing tool, from a first position spaced away from the shearing plane to a second position in the shearing plane, the heater being configured to define a heated region on the sheet metal workpiece by heating at least the edge location on the sheet metal workpiece along the shearing plane; and
a temperature sensor configured to detect a surface temperature of the heated region.

2. The apparatus as defined in claim 1 wherein:
the motion controller is configured to determine a relative position of the heater with respect to the sheet metal workpiece; and
the motion controller is to move the heater relative to the sheet metal workpiece.

3. The apparatus as defined in claim 1 wherein the heater is an induction heater.

4. The apparatus as defined in claim 1 wherein the heater is a laser that emits a laser beam.

5. The apparatus as defined in claim 4 wherein the laser beam has an adjustable laser beam shape.

6. The apparatus as defined in claim 5 wherein an irradiated area irradiated by the laser beam is bounded by a circle having an adjustable beam diameter from about 0.1 millimeter (mm) to about 30 mm.

7. The apparatus as defined in claim 5 wherein an irradiated area irradiated by the laser beam is bounded by an adjustable rectangle having an adjustable length from about 1 mm to about 200 mm or an adjustable width from about 1 mm to about 4 mm.

8. The apparatus as defined in claim 4 wherein the laser is to scan the laser beam by changing an angle of emission of the laser beam from the laser over the sheet metal workpiece to define the heated region on the sheet metal workpiece.

9. The apparatus as defined in claim 1 wherein the sheet metal workpiece has a top face and a bottom face opposite the top face and wherein the heater is to heat at least a portion of the top face and at least a portion of the bottom face simultaneously.

10. The apparatus as defined in claim 1, where the temperature sensor comprises a contacting sensor comprising a thermocouple.

11. The apparatus as defined in claim 1, wherein the temperature sensor comprises a non-contacting sensor.

12. The apparatus as defined in claim 11, wherein the non-contacting sensor comprises a pyrometer or an infra-red thermometer.

13. The apparatus as defined in claim 1, wherein the heater moves non-parallel to the shearing plane.

14. A method of trimming a sheet metal workpiece, comprising:
clamping the sheet metal workpiece at a working position on a base, the base being configured to support the sheet metal workpiece;
detecting a surface temperature of a heated region with a temperature sensor;
after the sheet metal workpiece is in the working position, in response to the surface temperature, heating, via a heater connected to the base, at least an edge location on the sheet metal workpiece along a shearing plane to define the heated region on the sheet metal workpiece;
after the heating, while the surface temperature remains within a target temperature range, trimming the sheet metal workpiece by mechanically inducing a shearing stress along the shearing plane via a shearing tool on the sheet metal workpiece to form an edge at the edge location on the sheet metal workpiece, the shearing tool being connected to the base and comprising guillotine having a moving blade and a fixed blade, the moving blade being configured to move across the fixed blade to shear the sheet metal workpiece; and
removing the sheet metal workpiece from the working position on the base;

wherein the heater is movable relative to the sheet metal workpiece independent of the shearing tool;

wherein a motion controller is to determine a relative position of the heater with respect to the sheet metal workpiece;

and wherein the motion controller is to move the heater relative to the sheet metal workpiece from a first position spaced away from the shearing plane to a second position in the shearing plane.

15. The method as defined in claim 14 wherein the target temperature range is 50 degrees Celsius to 500 degrees Celsius.

16. The method as defined in claim 14 wherein the heater is an induction heater.

17. The method as defined in claim 14 wherein the heater is a laser that emits a laser beam.

18. The method as defined in claim 17, further comprising changing an angle of emission of the laser beam from the laser to scan the laser beam over the sheet metal workpiece to define the heated region on the sheet metal workpiece.

19. The method as defined in claim 17, further comprising adjusting a laser beam shape.

20. The method as defined in claim 19 wherein an area irradiated by the laser beam is bounded by a circle having an adjustable beam diameter from about 0.1 millimeter (mm) diameter to about 30 mm diameter.

21. The method as defined in claim 19 wherein an area irradiated by the laser beam is bounded by an adjustable rectangle having an adjustable length from about 1 mm to about 200 mm or an adjustable width from about 1 mm to about 4 mm.

22. The method as defined in claim 14 wherein the sheet metal workpiece has a top face and a bottom face opposite the top face and wherein the heater is to heat at least a portion of the top face and at least a portion of the bottom face simultaneously.

23. The method as defined in claim 14 wherein the sheet metal workpiece is Transformation Induced Plasticity (TRIP) steel.

\* \* \* \* \*